United States Patent [19]

Kilgore

[11] 4,338,525

[45] Jul. 6, 1982

[54] MARINE PROPULSION SYSTEM

[75] Inventor: Lee A. Kilgore, Murrysville Boro, Pa.

[73] Assignee: Westinghouse Electric Corp., Pittsburgh, Pa.

[21] Appl. No.: 222,457

[22] Filed: Jan. 5, 1981

[51] Int. Cl.³ .................... B60L 11/12; H02P 7/66; H02P 1/52; H07P 3/24

[52] U.S. Cl. .................................... 290/17; 318/148; 318/723

[58] Field of Search ................. 318/723, 148; 290/17, 290/14

[56] References Cited

U.S. PATENT DOCUMENTS

| | | | |
|---|---|---|---|
| 755,824 | 3/1904 | Woodbridge | 318/723 |
| 2,137,989 | 11/1938 | Rossman | 318/723 |
| 3,588,645 | 6/1971 | Gilmore | 318/148 |
| 3,993,912 | 11/1976 | Ekstrom et al. | 290/17 |

*Primary Examiner*—B. Dobeck
*Assistant Examiner*—Shelley Wade
*Attorney, Agent, or Firm*—William D. Lanyi

[57] ABSTRACT

A marine propulson system is described that includes a gas turbine, an alternating current generator, a fixed pitch propeller, a synchronous motor and a frequency converter. The frequency converted is connected electrically between the generator and motor during starting and reversal procedures when the motor would normally have to operate as an induction motor. Means are provided to brake the system dynamically to speeds within the capacity of the frequency converter. At speeds within the frequency converter's design capacity, the motor can be operated synchronously while it is running at a speed below the minimum operating speed of the turbine and generator.

9 Claims, 3 Drawing Figures

MARINE PROPULSION SYSTEM

BACKGROUND OF THE INVENTION

Field of the Invention

This invention relates to a variable speed marine propulsion system and more particularly to a marine propulsion system which is adapted to provide a wide speed range while utilizing a unidirectional prime mover, an alternating current electrical generator, a synchronous electrical motor and a fixed pitch propeller.

Electrical marine propulsion systems provide many advantages not available in mechanical drive systems. They allow control from a number of locations aboard the ship, giving the navigator or operator direct control with a corresponding improvement in responsiveness to changing circumstances experienced during maneuvering operations. Electrical propulsion systems also provide a freedom of installation arrangement not possible in mechanical systems which require an in-line layout between the prime mover and the propeller. The engine-generator set can be positioned anywhere aboard the ship, allowing for greater freedom in distributing other equipment and the drive motor can be located proximate the stern to reduce shaft length.

Since some prime movers such as gas turbines and high-speed diesels are unidirectional machines, electrical propulsion systems possess the added advantages of permitting reverse rotation of the propeller by relatively simple control means and providing the necessary speed reduction to allow the selection of low-speed motors that match the desired propeller speed without the need of mechanical speed-reducing or reversing means.

Electric propulsion systems are classified as either direct-current or alternating-current systems. Direct-current systems have been used on the greatest number and variety of installations. They find application primarily in the low and moderate power ranges (1000 to 6000 horse power per shaft) and where flexibility of setup and ease of control are important whereas the use of alternating-current drives is generally associated with the use of turbine prime movers.

Of the alternating-current electric propulsion systems, early installations used induction motors because their torque performance afforded the conservatism required in applications where little was known about the actual torque requirements of a propeller in maneuvering situations. Also, on warships where the cruising power requirements were low and where an alternate speed ratio contributed to better economy of prime mover operation, the induction motor made practical the arrangement of pole-changing windings to obtain two different speed ratios between the prime mover and the propeller. The more desirable synchronous motors were applied with significant success after experience was gained through development and use of induction motor drive systems.

The use of synchronous motors has some significant advantages as compared to induction motors. Efficiency is improved since a typical slow-speed synchronous propulsion motor has a full-load efficiency of approximately 98 percent as compared to the 94 percent of a comparable induction motor. Since a synchronous motor can be operated at 100 percent power factor as compared to the 70–75 percent of a slow-speed induction motor, savings will be realized in both the weight and cost of the alternating-current generator and the larger air gap of a synchronous motor is conducive to more satisfactory installation and maintenance.

In a typical electrical propulsion system utilizing an alternating-current drive motor and a turbine prime mover, the generator is of the high speed turbo-type and is directly connected to the turbine through appropriate gearing means. The synchronous motor is generally connected directly to the propeller and is of the salient pole type. This type of motor is characterized by its large number of poles that allow it to operate at low speeds while being driven by a generator that operates at 3600 RPM (1800 RPM for four pole generators) and is usually large in diameter and short in length. With synchronous motors, the ratio of speed between the turbine-generator and the propeller motor is fixed by the ratio of the number of poles on the motor and the number of poles on the generator. This characteristic provides the same result as a mechanical reduction gearbox and allows the propeller speed to be controlled by regulating the fuel supply, and therefore the speed, of the prime mover. Since the motor must be capable of operating as in induction motor under the heavy torque loadings experienced during reversing conditions with headway on the ship, it must also be provided with a heavy pole face winding.

When starting or reversing the motor, it must operate as an induction motor until its speed is electrically close enough to that of the generator so that it may be synchronized. During this out-of-synchronization operation the motor power factor is low with high current demands. In order that generator voltage be maintained and the current needed to develop proper motor torque be provided, the generator must be over-excited on a short term basis. When the motor is reversed from full speed ahead, the continuation of the ship's movement through the water causes the water to flow past the propeller, resisting the motor's effort to stop and reverse and imposing severe conditions on it.

Speed control of the motor is typically accomplished by altering the frequency of the alternating current obtained from the generator. This is done by varying the speed of the turbine generator set. The turbine is usually under the control of a governing system with a working range of from 20 percent to 100 percent of maximum speed. All steady-state running is performed with the motor synchronized to the generator with speeds proportional to each other, whereas starting and reversing the motor requires asynchronous operation and the corresponding induction motor operational capability.

An alternating-current generator feeding a synchronous motor is the most economical electrical propulsion system to cover a wide range of motor speeds with a variable speed prime mover. However, in order to provide sufficient maneuvering torque for propeller reversal capability the ship propulsion design must specify larger motors to have sufficient induction motor torque. This is due to the fact that low-speed induction motors are inherently larger than synchronous motors.

The superior maneuvering capability of electric propulsion systems is of a great advantage in ice breakers. Ice breakers subject their propulsion systems to severe conditions during ice breaking operations. When the propeller collides with an ice formation, a geared motor would transfer the impact through the entire propulsion system to the prime mover, but an electric propulsion system effectively decouples the propeller from the prime mover and damage to the prime mover is avoided. Another ice breaking situation where electric propulsion systems are advantageous is when the propeller is frozen in the ice formation. To force it, a high torque is required at very low speed. Electric systems allow this to be accomplished. Generally, when the ship is involved in ice breaking operations, its movement comprises a series of collisions with the ice. If the ice proves too solid to be broken by the ship's present speed, the ice breaker backs up and collides again at a higher speed. This frequent changing of speed and direction demands the maneuverability made possible by an electric propulsion system.

A number of control systems which are known to those skilled in the art have been used to facilitate ship maneuvering. One such system, employing an alternating-current generator, synchronous motor and fixed pitch propeller, is shown in U.S. Pat. No. 3,993,912 of T. E. Eckstrom et al., issued Nov. 23, 1976. However, the Eckstrom system also uses synchronous motors in a way that requires them to have significant induction motor capabilities.

Future expansion of the use of electric ship propulsion systems that utilize synchronous motors will depend on the size and cost reduction of these systems without a corresponding sacrifice of the capability to perform sudden stops through the use of propeller reversal techniques. These reductions will be greatly facilitated if the requirement that the motor be able to perform as an induction motor can be minimized. The primary objective of the present invention, then, is to provide a marine propulsion system that utilizes a unidirectional prime mover, an alternating-current electrical generator and a synchronous motor but which reduces the requirement that the synchronous motor be able to perform as an induction motor. Since this induction motor capability increases the size requirements of the motor and therefore its cost, its minimization will make possible the use of smaller and less expensive motors and expand the application of alternating current motors in marine propulsion systems.

SUMMARY OF THE INVENTION

The present invention relates to the use of a solid-state frequency converter connected electrically between an alternating-current generator and a synchronous motor which, in turn, drives a fixed-pitch marine propeller to provide ship propulsion. The use of a frequency converter along with dynamic braking to slow both the motor and generator down to low speed, permits the use of a smaller motor and generator combination.

The frequency converter can be of any type that, functionally, is capable of converting an alternating-current input frequency to an alternating-current output frequency which is less than or equal to the input frequency while supplying torque to the synchronous motor throughout this range, including zero frequency. Two possible types are the converter direct-current link-synchronous and the cycloconverter type. The former has inherent full maneuverability. The controlled converters supply adjustable rectified current which is smoothed by direct-current link inductors. Commutation of current fed inverters is effected by the induced voltage of the motor over most of its operating range. The latter comprises a naturally commutated cycloconverter which couples the generator to the synchronous motor. This configuration also has inherent full maneuvering capability. Cycloconverters provide direct alternating current to alternating current conversion and, in order to be practical, the generator frequency must be significantly greater than the motor frequency. With any type of frequency converter, motor speed control is accomplished by regulating the firing speed of the frequency converter's solid-state switches.

The frequency changer is connected between the motor and generator electrically parallel to the direct motor-generator link used during normal running at higher speeds. In contrast to the normally fixed speed ratio as determined by the number of poles in the generator and motor, the present invention provides a variable speed ratio between the generator and the motor at low propeller speeds, avoiding the need to run the turbine at inefficiently low speeds or provide mechanical reduction gearing during maneuvers requiring propeller reversals. The present invention reduces the need for the synchronous motor to be built with significant induction motor capabilities in order to perform adequately in situations where the generator and motor are not synchronized such as sudden stop propeller reversals or when the ship is accelerated from a stationary condition.

When the ship proceeds from a standstill to full speed ahead, the frequency converter bridges the gap between the minimum generator speed which is typically 15 to 25 percent of its rated speed and the initial motor speed which begins at a standstill condition. The frequency converter continues to perform this function as its output to the motor is ramped to a speed equivalent to the actual minimum generator speed described above. During the ramping process the motor is running in synchronization with the frequency converter's output, therefore not requiring the significant induction motor capabilities and incumbent size requirements that would be necessitated by a direct connection between a generator running at 25 percent rated speed and a motor that is initially motionless.

When the motor reaches a speed equivalent to that of the generator, it can then be connected directly to the generator and the frequency converter can be disconnected from the motor. At all speeds above the generator's minimum, motor speed can be regulated by the conventional method of altering the speed of the turbine and generator.

Similarly, the frequency changer serves an important function during sudden stop situations that require propeller reversals. After slowing the turbine to its minimum speed with conventional methods, the frequency converter can be used to stop and then reverse the motor until the ship comes to a full stop. The detailed steps of these procedures are set forth below in the description of the preferred embodiment.

Within the design limitations of the frequency changer, fuel consumption can be reduced during low speed cruising by operating the turbine at or near full speed with the frequency converter supplying the lower required frequency to the motor. This would allow the turbine to be operated in its most efficient speed range rather than having its speed dictated by the desired motor speed.

BRIEF DESCRIPTION OF THE DRAWINGS

The invention will be more fully understood from following detailed description of the preferred embodiment, read in conjunction with the accompanying drawings, in which.

DESCRIPTION OF THE PREFERRED EMBODIMENT

Figure 1:
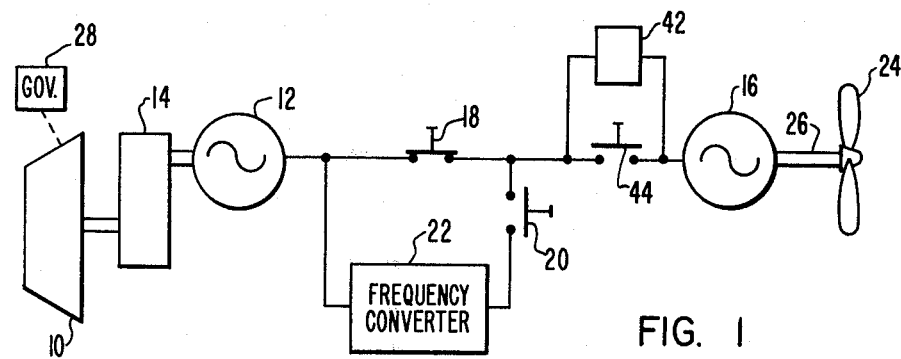
FIG. 1 is a schematic block diagram showing the ship propulsion system of the present invention applied to a single generator, single motor drive scheme.

The present invention is schematically shown in FIG. 1. A prime mover, such as a gas turbine engine 10, is mechanically connected to a three phase alternating-current generator 12 through a gearbox 14 suitably chosen to achieve the lower operating speed of the generator 12. The generator 12 is capable of being electrically connected to a synchronous motor 16 through either of two paths, depending on the condition of switchgear 18 and 20. With switchgear 18 closed and switchgear 20 opened, the generator 12 is electrically connected directly to the motor 16. Alternately, with switchgear 18 opened and switchgear 20 closed, the generator 12 is electrically connected to the motor 16 through the frequency converter 22. It is anticipated that, during transition from one connection mode to the other, both switchgear means 18 and 20 will temporarily be closed simultaneously so as to guarantee continuity between the generator 12 and the motor 16. The synchronous motor 16 is mechanically connected to a fixed pitch marine propeller 24 by a shaft 26.

The gas turbine 10 includes suitable speed control means shown as a governor 28 but which can comprise any of a number of systems which are well known to those skilled in the art. To further aid speed control of the motor during a sudden stop sequence, described below, a braking resistor 42 is provided. This resistor can be connected to the motor 16 by opening switchgear 44. During a rapid stop procedure when the motor 16 acts as a generator, this resistor 42 dissipates energy and provides dynamic braking capability.

In any specific marine propulsion system utilizing the concept embodied in the present invention, the maximum capacity of the frequency converter 22 is chosen as a function of the design characteristics of the turbine 10 as used in conjunction with the gearbox 14 and generator 12. Specifically, the converter 22 should have a maximum capacity (frequency) at least as great as the frequency of the generator 12 when the turbine 10 is operated at its minimum speed.

The present invention is applicable to all ship maneuvering conditions but a detailed description of two of these will disclose its advantages to anyone skilled in the art of ship propulsion design. The two maneuvering procedures that impose the most severe conditions on the propulsion system components are accelerating the ship from dead in the water to full speed ahead and decelerating the ship from full speed ahead to dead in the water, with the latter creating perhaps the most severe operating conditions that the propulsion system components ever experience.

Figure 2:
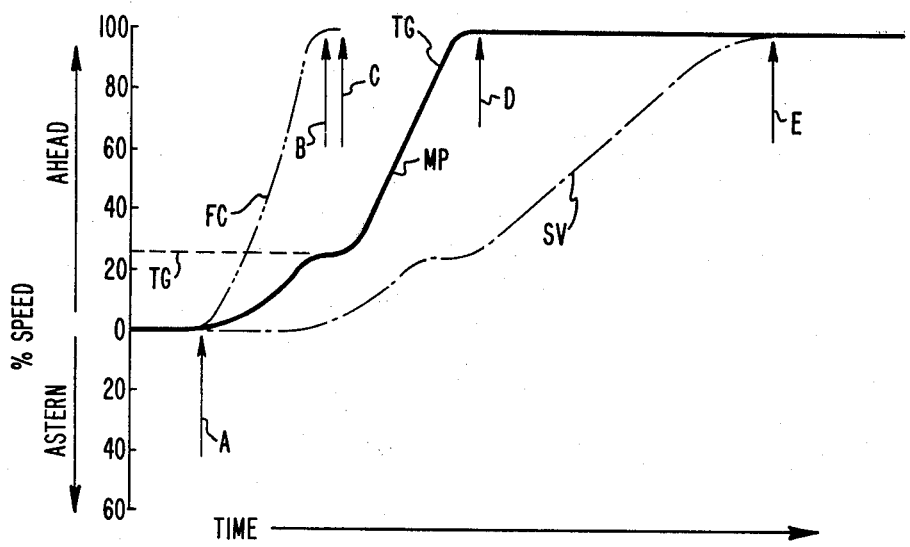
FIG. 2 is an exemplary graph showing the time-based changes of the turbine, generator, frequency converter output, motor, propeller and ship velocity as a percentage of their full speed ahead or astern during a typical transition from a standstill to full speed ahead.

In the detailed descriptions of the starting and sudden stopping of a ship comprising the present invention, references will be made below to the chronologies depicted in FIGS. 2 and 3. A brief description of those figures will be provided at this time in order to make the following discussions more informative. FIG. 2 is a time-based sequence of a start-up procedure showing the frequency of the output from the turbine and generator (TG), the frequency of the output from the frequency converter (FC), the speed of the motor and propeller (MP) and the magnitude of the ship's velocity (SV). All variables are shown as a percentage of their full frequency or speed capability. Five specific events are marked on FIG. 2 and referenced in the description below. They are the "full ahead" command (A), the point when the frequency output of the frequency converter is at the maximum capacity of the frequency converter (B), the time at which the frequency converter is disconnected (C), the time at which the turbine and generator have reached their full-speed capacity (D), and finally, the achievement of 100% speed ahead of the ship. Most important to the discussion of the start-up procedure is the period between B and C where the transfer is made from frequency converter control to turbine speed control.

Figure 3:
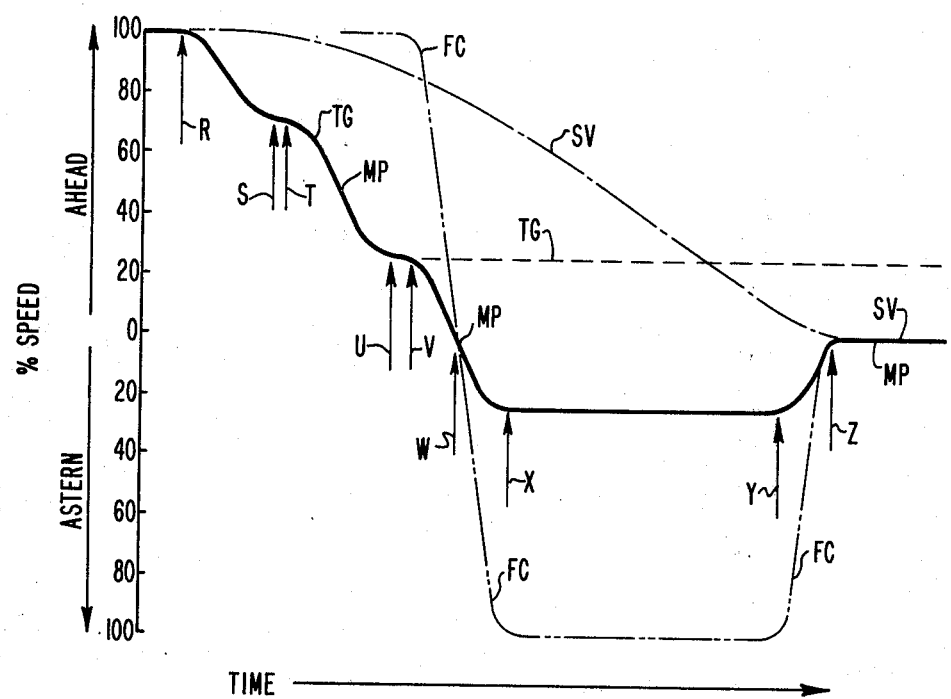
FIG. 3 is an exemplary graph showing the time-based changes of the turbine, generator, frequency converter output, motor, propeller and ship velocity as a percentage of their full speed ahead or astern during a typical sudden stop sequence from full speed ahead to full stop.

The curves in FIG. 3 represent the same variables as in FIG. 2 but the events are, of course, different since FIG. 3 describes the sequence of a sudden stop procedure. The events shown in FIG. 3 are the "stop" command (R), the reaching of "windmilling speed" (S), the connection of the braking resistor 42 across the motor 16 (T), the point in time when the turbine and generator have slowed to a speed within the frequency capacity of the foregoing converter (U), the disconnection of the generator from the motor (V), the motor and propeller reaching zero speed (W), the frequency converter reaching its maximum frequency output while in a phase reversal mode (X), the beginning of the ramping down of the reversed frequency converter output (Y), and finally the ship coming to a full stop (Z).

The following description of a starting procedure will refer to the components shown in FIG. 1 and the time-based curves shown in FIG. 2. To avoid the need to repeatedly identify which of the two figures is being referred to, the components of FIG. 1 are numbered and the curves of FIG. 2 are referred to by letters.

Beginning at event A, the "full ahead" command is given with the turbine and generator TG at idle speed. This speed is shown as approximately 25 percent of rated speed but, depending on the design rating of the frequency converter 22 and the efficiency-speed relationship of the turbine 10, it can vary. Without changing the turbine speed and with switchgear 18 open and switchgear 20 closed, thereby electrically connecting the frequency converter 22 serially between the generator 12 and the motor 16, the output of the frequency converter 22, FC, is increased from zero to its full capacity (in this case 25 percent of rated speed of the motor 16 and turbine 10) which occurs at event B. During this increase in speed the synchronous motor 16, MP, is running at synchronous speed with the output of the frequency converter 22. At event B, the motor 16 is in synchronization with the frequency converter 22 whose output is near its maximum capacity and is identical to its input from the generator 12. Between event B and event C the switch 18 is closed and switch 22 is opened and a direct electrical connection is created between the generator 12 and the motor 16 with the frequency converter 22 removed from the circuit. This transfer is performed with the motor 16 and propeller 24, MP, operating at approximately 25 percent of rated speed and the frequency converter 22 operating at approximately its capacity. Therefore, the choice of frequency converter 22 capacity will dictate the percent of capacity at which the turbine will be operating when this transfer is performed. At event C the frequency converter 22 is no longer electrically connected to the motor 16 and all subsequent speed control is accomplished by regulating the fuel supply to the turbine 10 as set by the governor 14. In this way the motor and propeller speed MP can be increased until it reaches 100 percent of rated speed at event D and ship velocity SV will increase accordingly until it reaches full speed ahead at event E some time later.

The above description represents one possible sequence of operations to achieve full speed ahead from a starting point with the ship standing dead in the water. Depending on the design capability of the various components, many alternate chronologies are, of course, possible.

Another important criterion in evaluating a ship propulsion system's maneuverability is its ability to bring the ship to a sudden complete stop from a full speed ahead condition. The following chronology will describe the sequence of operations, using the present invention, to accomplish this maneuver. It will refer to the components of FIG. 1 by number and the curves of FIG. 3 by letters.

Prior to event R the ship is running full speed ahead with switches 18 and 44 closed and switch 20 opened. The generator 12 and the synchronous motor 16 are running in synchronization at 100 percent of rated speed and the propeller 24, which is mechanically connected directly to the motor 16, is also running at full speed ahead, TG and MP. At event R the stop command is given and immediately the fuel supply to the turbine is stopped. The turbine 10 and its mechanically connected generator 12, TG, quickly slow to the turbine's "windmilling" speed at event S which is shown as approximately 70 percent of rated speed. This is shown by the speed curve of the turbine and generator, TG, which is also the speed curve of the motor and propeller, MP, which are running in synchronization with the generator 12. At event T, the braking resistor 42 is electrically connected across the windings of the motor 16 to cause dynamic braking. During this portion of the sequence, the ship continues to move forward at a speed greater than that which would be caused by the propeller speed and therefore the synchronous motor 16 acts as a generator, creating power which must be dissipated. The braking resistors 42 perform this function. This dynamic braking slows the motor 16, propeller 24, generator 12 and turbine 10 to a speed which is within the capacity of the frequency converter 22 shown at event U. At this point the switch 20 can be closed with the frequency converter 22 set to output a frequency equivalent to that of the generator 12. When this has been accomplished the generator 12 can then be electrically disconnected from the motor 16 by opening switch 18, shown as event V, and further speed control can be accomplished by decreasing the output, FC, of the frequency converter 22 from its maximum to zero. The motor 16 and propeller 24, MP, will reach zero speed at event W and, through phasing control of the frequency converter 22, begin reverse rotation until they reach a reverse speed equivalent to the maximum capability of the frequency converter 22 (shown here to be approximately 25 percent of rated speed at X). During this reversing operation the turbine and generator speed, TG, never go below its minimum speed since the turbine 10 and generator 12 were electrically disconnected at event V when the braking resistor 42 was also disconnected by closing switch 44.

The motor and propeller continue to rotate in reverse at a speed limited only by the capacity of the frequency converter 22 until the ship velocity, SV, slows to a point where the motor and propeller, MP, can be slowed (at event Y) until the ship velocity, SV, decreases to zero. At event Z the ship is standing dead in the water and the output, FC, of the frequency converter 22 is zero. Maneuvering within 25 percent of rated speed (ahead or astern) can now be accomplished by controlling the output of the frequency converter 22. For the infrequent case where it is desirable to drive the ship astern at a higher speed that is beyond the design capability of the frequency converter 22, two of the motor's three phase connections can be electrically exchanged during its zero speed crossover at event W and the starting procedure described above can be followed. This would bring the ship to a stop and then accelerate it astern.

This chronology describing a sudden stop sequence is one possible method of utilizing the present invention. Depending upon the size and capacities of the various components, other sequences may be preferable. Circumstances may require additional braking resistors or mechanical brakes to further absorb the power generated by the motor 16.

Although this invention has been described with a certain degree of particularity, both in the electrical schematic and the chronologies of starting and stopping, it is to be understood that the present disclosure has been made only by way of example and that numerous changes in detail, combination and sequence of operation of components can be accomplished without departing from the spirit and scope of this invention.

It should be apparent from the above discussion that a ship propulsion system has been provided that permits the use of a smaller and less expensive synchronous motor, reduces the severity of operating conditions on all components during a sudden stop motor reversal sequence and allows the turbine to be operated in its most economical range. It should also be apparent that although certain illustrative embodiments and procedures have been shown and described, the present invention is not so limited that other embodiments and modifications are not possible.

What I claim is:

1. A marine propulsion system comprising:
   a prime mover;
   means for controlling the speed of said prime mover;
   an alternating-current generator, said generator connected to and driven by said prime mover;
   a synchronous motor electrically connectable to an output of said generator;
   a fixed pitch marine propeller connected to an output of said motor;
   a solid state frequency converter whose input is the frequency of said generator and whose output is a lower frequency which is electrically connectable to said synchronous motor, said frequency converter being capable of maintaining said synchronous motor in synchronous operation when said motor is operating at a speed below that of said generator, said frequency converter being capable of supplying torque to said motor when the rotor of said motor is stationary;

a braking means;

switchgear means for electrically connecting said generator electrically to said motor; and switchgear means for electrically connecting the output of said frequency converter to and between said generator and said motor.

2. The marine propulsion system of claim 1, wherein:
said braking means comprises an electrical resistor connectable to said motor.

3. The marine propulsion system of claim 1, wherein:
said alternating-current generator is of the three-phase type.

4. The marine propulsion system of claim 3, further comprising:
means for reversing two of the electrical phases of the alternating-current input to said motor.

5. The marine propulsion system of claim 1, wherein:
said prime mover comprises a gas turbine engine.

6. A ship propulsion system, comprising:
a prime mover;
means for controlling the speed of said prime mover;
a three-phase alternating-current generator connected to said prime mover;
a synchronous motor;
a solid state frequency converter connected electrically to said generator and capable of converting the frequency of said generator to any preselected frequency in the range from zero to the minimum operating frequency of said generator, said frequency converter being connectable to said motor and being capable of supplying torque to said motor throughout said range of frequencies;
a marine propeller mechanically connected to said synchronous motor;
means for electrically connecting and disconnecting said synchronous motor to the output of said frequency converter;
means for electrically connecting and disconnecting said synchronous motor to said generator;
means for reversing the electrical phase relationship of said generator;

a braking means capable of slowing the rotational speed of the rotor of said synchronous motor; and
whereby said synchronous motor is maintained in synchronous operation throughout its complete range of speeds both forward and reverse.

7. A method of initiating motion of a stationary marine vessel whose propulsion system comprises a prime mover, an alternating-current electrical generator, a frequency converter, a synchronous motor and a fixed pitch propeller, said method comprising:
operating the prime mover at its minimum speed;
electrically connecting the frequency converter in series with and between the generator and the synchronous motor with the output of the frequency converter connected electrically to the synchronous motor;
increasing the output of the frequency converter from near zero to the desired running speed of the motor; and
electrically connecting the output of the generator directly to the motor and electrically disconnecting the frequency converter from the motor when the speed of the motor approaches the output capacity of the frequency converter.

8. A method for stopping the motion of a moving naval vessel whose propulsion system comprises a prime mover, an alternating-current electrical generator, a frequency converter, a synchronous motor and a fixed pitch propeller, said method comprising:
discontinuing the supply of fuel to the prime mover;
connecting a braking means to the propulsion system;
electrically connecting the frequency converter in series with and between the generator and the motor when the speed of the motor has decreased to a value within the operational range of the frequency converter;
decreasing the output of the frequency converter to the motor to zero;
reversing the phasing sequence of the frequency converter's output to the motor; and
increasing the phase reversed output of the frequency converter to the motor.

9. The method of claim 8, further comprising:
decreasing the phase reversed output of the frequency converter to the motor as the naval vessel's speed decreases to zero.

* * * * *